Figure 4:
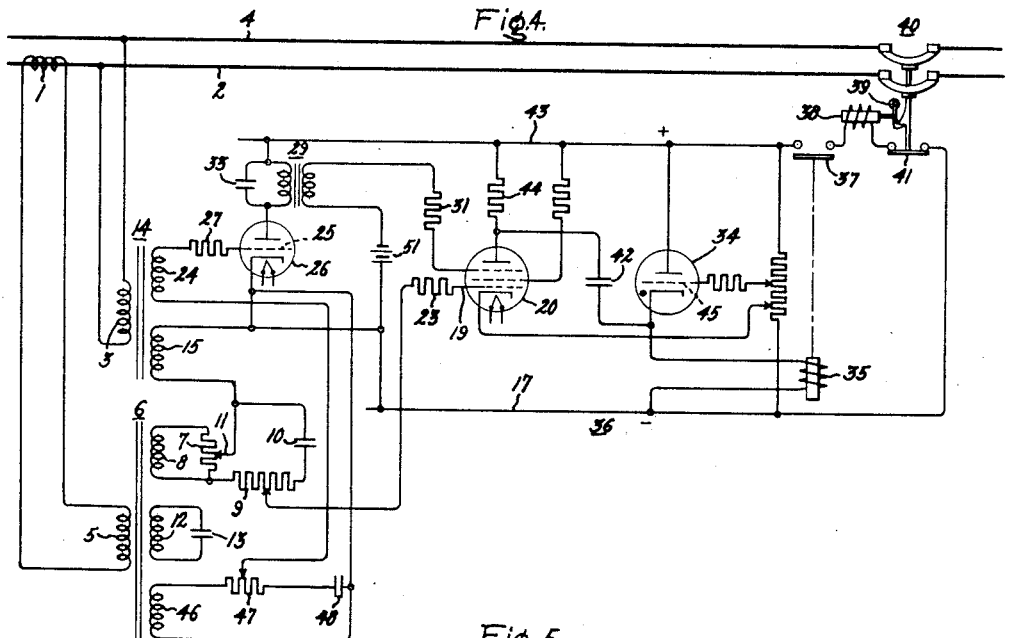

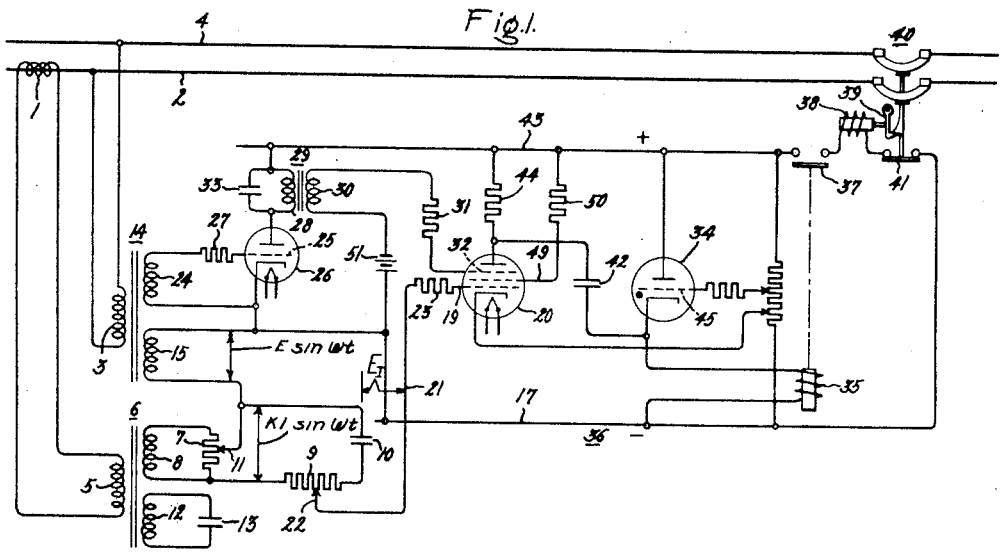

Inventor:
Albert R. van C. Warrington,
by Ernest C. Britton
His Attorney.

Patented June 13, 1950

2,511,680

UNITED STATES PATENT OFFICE 2,511,680

ELECTRONIC RELAY ARRANGEMENT FOR PROTECTING POWER SYSTEMS

Albert R. van C. Warrington, Wallingford, Pa., assignor to General Electric Company, a corporation of New York Application October 14, 1948, Serial No. 54,533

13 Claims. (Cl. 175—294)

My invention relates to electronic relay arrangements for protecting power systems and more particularly to a protective arrangement which is operable in response to predetermined instantaneous current and voltage conditions existing during a fault on the protected power system.

In the United States Letters Patent 2,405,081, Warrington, granted July 30, 1946, and assigned to the assignee of this invention, there is disclosed and claimed a relay arrangement wherein elctromagnetic relays of the so-called wattmetric type are utilized to protect an electric power system. The relays of this Warrington patent are of the well-known mho type.

In the United States Letters Patent 2,229,561, Bivens, granted October 20, 1942, and assigned to the assignee of this application, there is disclosed a protective apparatus utilizing electronic valves for protecting electric power systems. My invention constitutes an improvement of the arrangement disclosed and claimed in the abovementioned Bivens' patent and is similar to the arrangement disclosed in the above-mentioned Warrington patent in that it is adapted to be applied to a power system in substantially the same way and in that the relay itself is of the mho type. Also my invention is related to the invention disclosed and claimed in application Serial Number 54,368, filed October 14, 1948, Macpherson assigned to the assignee of this application.

One object of my invention is to provide an improved electronic relay having rapid and unchanging time characteristics so that a fault condition may be cleared promptly irrespective of the distance from the fault to the relay.

Another object of my invention is the provision of a relay having more precise operating characteristics than presently-known devices.

Still another object of my invention is to provide an electronic mho relay whose characteristic impedance circle may be offset from the origin of the impedance diagram so that the relay will be capable of reaching up and down the power line even though the relay is primarily directional in character.

A further object of my invention is the provi ion of relay having an impedance characteristic which may readily be offset so as to afford reach in one direction without interfering with the reach setting of the relay in the other direction.

A still further object of my invention is to provide a relay arrangement wherein a gaseous discharge tube is utilized to control the trip circuit of an interrupter in response to the brief impulse which is provided by a vacuum tube which is responsive to a fault condition and which together with other circuit elements serves to impart the particular impedance characteristics to the relay.

A relay arrangement embodying my invention comprises three essential components, i. e., a measuring circuit, a pulsing circuit, and a tripping circuit. The measuring circuit comprises means for producing a voltage which is a function of the system voltage, means for producing a voltage dependent upon the system current, and means for comparing these two voltages and supplying the resultant voltage to the control grid of a five-element vacuum tube. If the instantaneous values of system voltage and current bear a predetermined relationship one to the other which relationship is indicative of a fault condition on the power system, the hold-off bias of the control grid will be overcome. The pulsing circuit comprises a peaking transformer and an electronic valve responsive to system voltage for energizing the suppressor grid of the pentode at the maximum instantaneous value of the system voltage. Thus, the pentode will conduct at the instant when the system voltage is a maximum if a predetermined voltage resulting from a system fault is supplied to the control grid thereof by the measuring circuit. The tripping circuit includes means for energizing the trip coil of a circuit breaker associated with the protected line section in response to the flow of current through the pentode. As will be explained more fully hereinafter, a relay arrangement embodying my invention is characterized by a circular impedance characteristic well known in connection with electromagnetic mho relays. In accordance with a further feature of my invention, I provide means for offsetting the mho circle from the origin which comprises means for inserting into the pulsing circuit an electrical quantity produced by the system current.

In the following description my invention is set forth in connection with a mho relay but it will be understood that it is equally applicable to other types of relays. For example, instead of producing a voltage by comparing a voltage derived from the power system current with a voltage derived from the power system voltage, the control voltage could be produced by comparing two voltages both of which are dependent upon various other electrical quantities such, for example, as the current entering and leaving a protected piece of electrical apparatus, or section of power line. Furthermore, the instant at which the suppressor grid is energized need not be at the peak of the system voltage but could be at some other time such for example at the zero point of the system current in which event the relay would be of the reactive type.

My invention will be better understood from the following description when taken in connection with the accompanying drawings and the scope of the invention will be pointed out in the appended claims.

Figure 5:
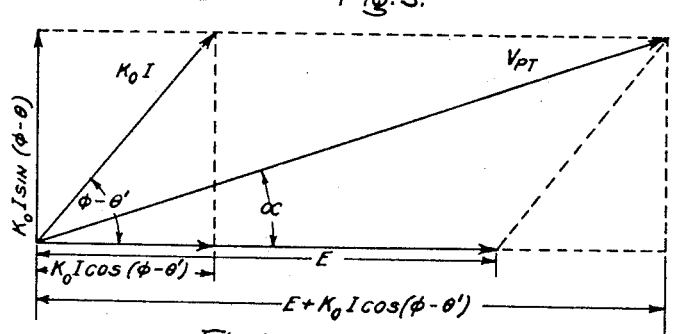
Figure 6:
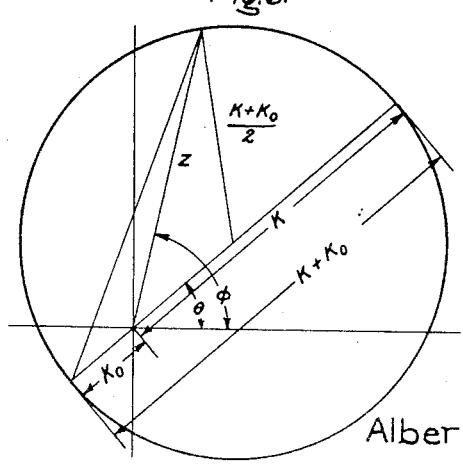

In the accompanying drawings, Fig. 1 is a diagrammatic representation of the various circuit elements comprising my invention, Fig. 2 is a family of curves to aid in explaining the operation of the circuit of Fig. 1, Fig. 3 is an impedance diagram to aid in explaining the characteristics of the circuit shown in Fig. 1, Fig. 4 is a diagrammatic representation of the circuit elements embodied in my invention wherein means are provided for modifying the circuit of Fig. 1 to produce an offset impedance characteristic, Fig. 5 is a vector diagram to aid in explaining the principles of the circuit shown in Fig. 4, and Fig. 6 is an impedance diagram also for the purpose of aiding in explaining the circuit elements of Fig. 4.

It will be obvious to those skilled in the art that the circuit shown in Fig. 1 comprises an arrangement for protecting two conductors of a transmission line. It will be understood that two other arrangements identical to the arrangement of Fig. 1 would be necessary to afford protection for example, for a three-phase transmission line as explained in the above-mentioned Warrington Patent 2,405,081. Furthermore, it will be understood by those skilled in the art that the arrangement of Fig. 1 would comprise an MI or an M2 mho relay unit as explained in the above Warrington patent.

The measuring circuit of Fig. 1 will now be described. A current transformer 1 is energized in accordance with current flow in line conductor 2 and one winding 3 of a potential transformer is energized in response to the voltage appearing across line conductors 2 and 4. Energy from the secondary winding from current transformer 1 is supplied to the primary winding 5 of the transactor unit 6. Transactor unit 6, in effect, is a combined reactor and transformer. A resistor 7 is connected across the terminals of the secondary winding 8 of the transactor 6. A selected portion of the voltage across resistor 7 is impressed across resistor element 9 and capacitor element 10 by suitable adjustment of the sliding contact 11. In this way a voltage which is a function of the system current in conductor 2 is impressed across the series connected resistor 9 and capacitor 10 and on Fig. 1 is designated as $KI \sin wt$.

Because the voltage across a reactor or a transactor is proportional to frequency, harmonics are exaggerated. To overcome this objectionable tendency which would distort the relay impedance characteristic, a capacitor 13 is connected across the secondary winding 12 to neutralize this effect, because the voltage across capacitor 13 is inversely proportional to the frequency as is well known.

As explained above, the voltage $E_I$ is compared with a voltage which is a function of the system voltage. The system voltage applied across the primary winding 3 of the potential transformer 14 establishes a voltage in the secondary winding 15 of the transformer 14. This voltage, dependent on the system voltage, may be represented by the expression $$E \sin wt$$

and is indicated in Fig. 1. Thus, when the voltage $E \sin wt$ is bucked against the voltage $E_I$, the resultant voltage will determine the potential of the control grid 19 of the pentode 20 since the control grid 19 is connected to the measuring circuit through the conductor 21 and the schematically-represented sliding contact 22. In practice I have found it desirable to arrange the circuit so that the control grid 19 will prevent the pentode 20 from conducting whenever the voltage $E \sin wt$ is greater than the voltage $E_I$ so that the control grid 19 will allow the pentode to conduct if these two voltages are equal or if $E_I$ exceeds $E \sin wt$.

While the tube 20 is shown on the drawings and referred to in the description as a pentode it will be obvious that an electronic device having a different arrangement and number of electrodes could be used provided that the measuring and timing voltages are utilized as explained above without departing from my invention. For example, the screen grid 49 is connected to the positive bus 43 through the resistor 50 and is merely for the purpose of improving the amplifying characteristics of the tube 20 but does not affect the invention.

The function of the measuring circuit above described will be better understood with reference to Fig. 2. In Fig. 2 the relay voltage $E \sin wt$ is proportional to and in phase with the system voltage. The relay current $I \sin wt$ is likewise proportional to and in phase with the current in conductors 2 and 4 and lags the relay voltage $E \sin wt$ by the system power factor angle $\phi$. The letter $\phi$ represents the power factor of the line during fault conditions. This is because there is negligible angular shift in these quantities by virtue of the transformers 1 and 14.

It has been stated that it is desirable to allow the pentode to be conductive by means of the control grid at the moment when $E \sin wt$ is a maximum. If the voltage $E_I$ is in phase with the line current it would be most effective in overcoming $E \sin wt$ when the power factor angle of the system is zero degrees. The angle of maximum reach of the relay would then lie along the R-axis of a diagram such as that shown in Fig. 3. In practice it is desirable to have the angle of maximum reach occur at some angle between 45 and 75 degrees from the R-axis. To this end the natural angle of the transactor 8 and a means comprising the capacitor 10 and the resistor 9 are utilized to cause the voltage $E_I$ to shift by an angle $\theta$. In addition the polarity of transactor 8 is reversed so that $E_I$ is directly out of phase with $E \sin wt$ at the system power factor angle $\phi$ and the angle of maximum reach occurs at the angle $\theta$. When this is done, the respective magnitudes of the voltage $E_I$ and the voltage $E \sin wt$ will determine the potential applied to the control grid 19 of the pentode 20. The resistor 23 is merely for the purpose of preventing damaging current flow through the conductor 21 under abnormal conditions.

As explained above, it is desirable to have the pentode 20 conductive at the instant when the line voltage $E \sin wt$ is a maximum. To this end the above-mentioned pulsing circuit is used wherein the secondary winding 24 of the transformer 14 is utilized to control the potential of the grid 25 of the triode 26 through resistor 27. The triode 26 has characteristics such that it will saturate in response to a relatively small change in potential of the grid 25 so that the tube will conduct heavily even though the potential supplied to grid 25 is quite low as would be the case when a phase-to-phase fault involving conductors 2 and 4 occurs very close to the relay. The plate circuit of triode 26 includes the primary winding 28 of peaking transformer 29. The secondary winding 30 of peaking transformer 29 is connected through a resistor 31 to the suppressor grid 32 of the pentode 20 and also to the relatively large biasing potential 51. The voltage produced by the peaking transformer 29 is represented in Fig. 2 by the curve $E_{pt}$. From Fig. 2 it will be seen that the peaking transformer voltage $E_{pt}$ occurs when the voltage $E \sin wt$ is a maximum. This is desirable because experience has shown that a great majority of fault conditions are initiated at or just before the instant when the line voltage is a maximum. Furthermore, as will be more fully explained hereinafter, a circular impedance characteristic is achieved by selecting the maximum instantaneous value of the line voltage as the instant when the pulsing circuit energizes the suppressor grid 32 of the pentode 20 so as to overcome the large bias of the potential 51 and thereby to allow the pentode 20 to conduct provided the potential supplied to the control grid 19 of the pentode 20 is indicative of a fault condition on a circuit comprising conductors 2 and 4. The voltage $E_{pt}$ produced by the peaking transformer actually is utilized only at the instant of positive voltage maximum of the line voltage due to the inherent characteristics of the triode 26. It will be understood by those skilled in the art that another triode such as 26 could be utilized to energize another peaking transformer similar to 29 when the line voltage is a maximum negative value so that a pulse would occur every half cycle as shown in Fig. 2. For purposes of simplicity, this additional triode is not shown in Fig. 1. It will be understood by those skilled in the art that the peak occurring at the negative half cycle of $E \sin wt$ can be utilized to allow an additional pentode similar to 20 to be conductive. The control grid of the additional pentode would be supplied with a voltage similar to $E_I$ except reversed in polarity. By these means the relay unit hereindescribed would measure the line impedance once each half cycle and during fault conditions would operate within one half cycle after the occurrence of the fault irrespective of whether the fault should occur during the negative or positive half cycle of system voltage $E \sin wt$.

As mentioned above, the triode amplifier 26 is arranged so that it saturates when a relatively small grid voltage is applied thereto. Thus, a relatively constant peaking voltage occurs across the secondary winding 30 of the peaking transformer 29 even though the voltage applied to the grid 25 of the triode 26 may vary over a relatively wide range. In this way, uniform potentials are applied to suppressor grid 32 of pentode 20 and attendant consistency of operation is achieved. Should the fault be within the first zone, for example, the MI unit might not operate properly if the fault within zone I were close enough to the MI unit to cause the line voltage between conductors 2 and 4 to drop below a predetermined minimum value in which event the triode 26 would not fire. For the purpose of making sure that the triode amplifier 26 will fire in response to a fault condition when very low line-to-line voltages exist, memory action means are provided. This memory action arrangement is accomplished by the tuned circuit comprising the primary winding 28 of the peaking transformer 29 and the capacitor 33. In this way a memory action peak for several cycles is maintained after the fault occurs. Thus, ample time is provided for energizing the suppressor grid 32 of the pentode 20 to allow the tripping circuit of the associated circuit breaker to become energized.

When the pentode 20 is rendered conductive by means of the operation of the measuring and pulsing circuits already described, the tripping circuit will be energized. More specifically the pentode 20, when made sufficiently conductive, has a brief pulse of current flowing in its plate circuit and causes the gaseous discharge tube 34 to fire and to remain conductive thus energizing the coil 35 of the relay 36, which in turn closes its contacts 37 to energize the circuit breaker tripping coil 38. Upon energization of tripping coil 38, the latch 39 of the latch closed circuit breaker 40 is tripped and the circuit breaker 40 is opened. The tripping circuit includes the normally closed auxiliary contact 41 operated by the circuit breaker mechanism. Thus in accordance with my invention a tube such as 20 and having precise and unchanging characteristics is used to determine the conditions of the protected power systems and to actuate a gaseous discharge tube such as 34 which does not have precise and unchanging characteristics but which is capable of remaining conductive after receiving the brief activating pulse from the vacuum tube so as to insure operation of the interrupter tripping circuit.

The gas filled tube 34 fires due to the action of capacitor 42 when the pentode 20 passes plate current. Normally capacitor 42 has impressed thereacross a voltage equal to the voltage between the negative bus 17 and the positive bus 43. When pentode 20 is rendered conductive, a plate circuit current flows through the resistor 44. The voltage drop through resistor 44 causes the potential of the upper plate of the capacitor 42 to be quickly reduced. Since there is no path through which the capacitor 42 may discharge quickly the voltage thereacross is maintained for a brief period during which the negative plate of the capacitor 42 is driven more negative relative to the grid 45 of the tube 34. This, in effect, renders the cathode of the triode 34 more negative with respect to the grid 45 thereof so that triode 34 is rendered conductive. In this way the relay 36 is energized and the circuit breaker 40 opened as explained above.

As pointed out above, the impedance characteristic of the relay embodying my invention is circular and passes through the origin and the relay therefore is of the well-known mho type. The voltage $E_I$, which is a function of the line current, may be expressed:

$$KI \sin wt - (\phi - \theta)$$

where K is the constant of the measuring circuit and where $\phi$ is the power factor angle and $\theta$ is the angle of the measuring circuit. Since the pentode 20 is rendered conductive in so far as control grid 19 is concerned when the voltage derived from the current in the power system is equal to the voltage $E \sin wt$ derived from the system voltage, the quantities may be equated.

$$KI \sin wt - (\phi - \theta) = E \sin wt$$

Since the pentode 20 is held off by the suppressor grid 32, except when the line voltage is a maximum, i. e., when $wt$ equals 90°, the above equation may be written as follows:

$$2 \qquad E = KI \cos (\phi - \theta)$$

or $$3 \qquad K \cos (\phi - \theta) = \frac{E}{I}$$

which is the impedance Z measured by the relay so that $$4 \qquad Z = K \cos (\phi - \theta)$$

Equation 4 is a circle of diameter equal to K which circle represents the impedance characteristic of a mho relay.

In Fig. 3 the quantities appearing in Equation 4 are graphically represented. From Fig. 3 it is obvious that changes in the angle $\theta$ of the measuring circuit will merely shift the circle clockwise or counterclockwise about the origin of the X—R diagram, and that changes in the power factor angle $\phi$ will merely change the value and angular disposition of the impedance Z. Because the impedance Z forms one leg of a right triangle and because the diameter K of the circle forms the hypotenuse of the triangle, changes in the magnitude and angular disposition of the quantity Z will not destroy the circular characteristic of the relay.

As explained in the above-mentioned Warrington Patent 2,405,081, for example, it is desirable to cause a mho relay unit M3 to have a characteristic which is offset with respect to the origin so that the relay is capable of reaching in the opposite direction along the transmission line from that of the reach of the mho relay units M1 and M2. To this end the circuit arrangement shown in Fig. 4 may be used. The circuit of Fig. 4 is identical to the circuit of Fig. 1 except that in Fig. 4 means are provided for shifting the peaking voltage produced by the pulsing circuit with respect to the voltages produced by the measuring circuit. To this end a secondary winding 46 is added to the transactor 6 and the voltage developed across this secondary winding is applied to a resistor 47 connected in series with a capacitor 48. The voltage developed across the capacitor 48 is supplied between the cathode of the triode 26 and the secondary winding 24 of the potential transformer 14. This voltage may be represented by the expression:

$$K_0 I \sin [wt + (\phi - \theta')]$$

where $K_0$ is a constant converting line current to offsetting voltage in the transactor and where $\phi$ is the system power factor and $\theta'$ is the relay angle of the offsetting voltage.

The total voltage impressed on grid 25 of tube 26 is the vector sum of the voltage across resistor 47 and capacitor 48 and the voltage $E \sin wt$ may be expressed as follows:

$$5 \qquad V_{pt} = E \sin wt + K_0 I \sin [wt + (\phi - \theta')]$$

The vector sum of the above two quantities which are combined to produce the pulsing tube voltage will be a maximum at some point on the system voltage wave $E \sin wt$ other than the maximum point. Thus, because the sum of the two quantities represented by Equation 5 will cause by means of the peaking transformer 29 in the plate circuit of tube 26 the suppressor grid 32 of pentode 20 to allow pentode 20 to conduct during fault conditions when the vector sum of these two quantities is a maximum it is necessary to determine the time when Equation 5 will be a maximum. The time so determined may be substituted in Equation 5 and the expression of an offset mho type impedance circle may be derived. Expanding the right-hand side of Equation 5

$$6 \qquad V_{pt} = E \sin wt + K_0 I \sin wt \cos (\phi - \theta') + K_0 I \cos wt \sin (\phi - \theta')$$

Rearranging $$7 \qquad V_{pt} = [E + K_0 I \cos (\phi - \theta')] \sin wt + [K_0 I \sin (\phi - \theta')] \cos wt$$

This expression may be shown on a vector diagram as in Fig. 5. From the vector diagram it is seen that the instantaneous value of voltage applied to the grid of tube 26 may be expressed as $$8 \qquad v_{pt} = V_{pt} \sin (wt + a)$$

where $a$ is the angle between the reference vector $E + K_0 I \cos (\phi - \theta')$ and $V_{pt}$. Equation 8 is a maximum when $\sin (wt + a) = 1$ or when $wt + a = 90°$. It follows that $$9 \qquad wt = 90° - a$$

which indicates the time when the pentode in the tube circuit will be gated and allow comparison of line voltage and line current. It is apparent from Equation 9 that $$10 \qquad \cos wt = \sin a \text{ and } \sin wt = \cos a$$

from the vector diagram in Fig. 5 it is seen that $$11 \qquad \cos a = \frac{E + K_0 I \cos (\phi - \theta')}{V_{pt}}$$

and $$\sin a = \frac{K_0 I \sin (\phi - \theta')}{V_{pt}}$$

To facilitate substitution, Equation 1 may be expanded as follows $$12 \qquad E \sin wt = KI \sin wt \cos (\phi - \theta) + \cos wt \sin (\phi - \theta)$$

The expressions for $\sin wt$ and $\cos wt$ as shown in Equations 10 and 11 may now be substituted in Equation 12 and the expression for an offset mho type impedance circle derived as follows $$13$$
$$E \frac{E + K_0 I \cos (\phi - \theta')}{V_{pt}} = $$
$$K'I \frac{E + K_0 I \cos (\phi - \theta')}{V_{pt}} \cos (\phi - \theta) + \frac{K_0 I \sin (\phi - \theta') \sin (\phi - \theta)}{V_{pt}}$$

simplifying $$14$$
$$E^2 + K_0 EI \cos (\phi - \theta') = KEI \cos (\phi - \theta) + KK_0 I^2 \cos (\phi - \theta) \cos (\phi - \theta') + KK_0 I^2 \sin (\phi - \theta) \sin (\phi - \theta')$$

This equation can further be developed to show that it is that of an offset mho type impedance circle. To simplify the development, however, the relay angle $\theta$ will be assumed equal to the angle of the offsetting voltage $\theta'$; since this is generally true in the application of mho type relays Equation 14 may now be written $$15 \qquad E^2 + K_0 EI \cos (\phi - \theta) - KEI \cos (\phi - \theta) = KK_0 I^2$$

or $$16 \qquad E^2 - (K - K_0) EI \cos (\phi - \theta) = KK_0 I^2$$

Dividing by $I^2$ and letting $$Z = \frac{E}{I}$$

17  $\quad Z^2 - (K-K_0) Z \cos(\phi-\theta) = KK_0$

Adding $$\frac{(K-K_0)^2}{2}$$

to each side of the equation

18  $\quad Z^2 - (K-K_0) Z \cos(\phi-\theta) + \frac{(K-K_0)^2}{2} =$ $$\frac{4KK_0}{4} + \frac{K^2 - 2KK_0 + K_0^2}{4}$$

or

19  $\quad Z^2 - (K-K_0)(Z \cos(\phi-\theta) + \frac{(K-K_0)^2}{2} = \frac{(K+K_0)^2}{2}$ which is recognized as the equation of an offset mho type impedance circle with diameter equal to $K+K_0$ of which $K_0$ is the offset and $K$ is the original diameter before offset. Equation 19 is shown diagrammatically in Fig. 6.

It should be noted from Fig. 6 that the portion $K$ of the diameter of the mho impedance circle is identical to the diameter of the mho impedance circle shown in Fig. 3. Stated otherwise the offset is achieved by enlarging the characteristic circle of a relay such as that shown in Fig. 3 without changing the reach of the unit in the direction opposite from the reach determined by the offset. This feature allows adjustment of the offset reach by varying the circuit elements of Fig. 4 without interfering in any way with the reach of the relay in the other direction so that readjustment after setting the offset is not necessary. It will be obvious to those skilled in the art that a relay arrangement such as that shown in Fig. 1 having characteristics such as are shown in Fig. 3 is well suited for use as an M1 or an M2 unit for zones 1 and 2, and that the arrangement shown in Fig. 4 having characteristics such as those shown in Fig. 6 is adapted for use as an M3 unit for third zone application.

While I have, in accordance with the patent statutes, shown and described my invention as applied to a particular power system and as embodying various devices diagrammatically indicated, changes and modifications will be obvious to those skilled in the art, and I, therefore, intend in the appended claims to cover all such changes and modifications as fall within the true scope and spirit of my invention.

What I claim as new and desire to secure by Letters Patent of the United States is:

1. A mho relay arrangement for completing the trip circuit of a circuit interrupter in an electric power system comprising an electronic device having a control grid and a suppressor grid, means for deriving from the power system a voltage dependent on an electrical quantity of the system, means for deriving from the power system a voltage dependent on another electrical quantity of the system, means for shifting at least one of these voltages so that the two voltages are substantially 180° out-of-phase during fault conditions, means for comparing these two voltages and for supplying the resultant voltage to the control grid of said electronic device, and means for energizing the suppressor grid of said electronic device at a predetermined instant in the cycle of the one electrical quantity to operate said device when the resultant voltage supplied to the control grid thereof is of a predetermined value.

2. A mho relay arrangement for completing the trip circuit of a circuit interrupter in an electric power system comprising an electronic device having a control grid and a suppressor grid, means for deriving from the power system a voltage dependent on the system voltage, means for deriving from the power system a voltage dependent on the system current, means for shifting at least one of these voltages so that the two voltages are substantially 180° out-of-phase during fault conditions, means for comparing these two voltages and for supplying the resultant voltage to the control grid of said electronic device, and means for energizing the suppressor grid of said electronic device when the instantaneous voltage of the system is a maximum value to operate said device when the resultant voltage supplied to the control grid thereof is of a predetermined value.

3. A mho relay arrangement for completing the trip circuit of a circuit interrupter in an electric power system comprising an electronic device having a control grid and a suppressor grid, means for deriving from the power system a voltage dependent on the system voltage, means for deriving from the power system a voltage dependent on the system current, means for shifting at least one of these voltages so that the two voltages are substantially 180° out-of-phase during fault conditions, means for comparing these two voltages and for supplying the resultant voltage to the control grid of said electronic device, and means for energizing the suppressor grid of said electronic device when the instantaneous value of the system voltage is a maximum to operate said device when the resultant voltage supplied to the control grid thereof is substantially zero.

4. A relay arrangement for completing the trip circuit of a circuit interrupter in an electric power system comprising an electronic device having a control grid and a suppressor grid, means for energizing the control grids of said devices in accordance with predetermined voltage and current values of the system, means for deriving from the power system a voltage dependent upon the system voltage, means for deriving from the power system a voltage dependent upon the system current, and means for combining these two last mentioned voltages and for supplying the combined voltage to the suppressor grid of said device to cause said device to operate when the combined instantaneous voltage is a maximum and when the voltage supplied to the control grid is indicative of a fault condition on the system.

5. A mho relay for operating circuit interrupting means in an electric power system and having an offset impedance characteristic comprising electronic means, means for supplying an operating voltage to said electronic means during both the positive and negative half cycles of the system voltage, said operating voltage being derived from predetermined electrical quantities of the system, means for deriving two electrical quantities from the system dependent on the system voltage and current respectively, means for vectorially adding the two quantities derived from the system voltage and current, and means for supplying the vector sum of these two quantities to said electronic means during both the positive and negative half cycles thereof to render said electronic means conductive when the vector sum of such quantities is a maximum and when an operating voltage indicative of a fault condition on the system is supplied to said electronic means.

6. A mho relay for affording protection for an electric power system and having an offset impedance characteristic comprising an electroresponsive device, means for supplying to said device a predetermined electrical quantity indicative of a fault condition on the system, means for deriving a voltage from the system dependent on the system voltage, means for deriving a voltage from the system dependent on the system current, means for combining the two derived voltages, and means for supplying the combined voltage to said electroresponsive device to operate said device only at a predetermined instant in the cycle of said combined voltage and when the value of the electrical quantity supplied to said device is indicative of a fault condition on the system.

7. A mho relay for operating circuit interrupting means in an electric power system and having an offset impedance characteristic comprising two electronic devices each having a control grid and a suppressor grid, means for supplying the control grids with alternate half cycles of an operating voltage derived from the system voltage and current, means for deriving two electrical quantities from the system dependent on the system voltage and current respectively, means for combining said quantities, and means for supplying the positive half cycles of the resulting quantity to the suppressor grid of one device and the negative half cycles of the resulting quantity to the suppressor grid of the other device to operate each device when the resulting quantity is a maximum value and when an operating voltage indicative of a fault condition on said system is supplied to the control grids.

8. A mho relay for affording protection for an electric power system and having an offset impedance characteristic comprising an electroresponsive device, means for supplying to said device a predetermined electrical quantity indicative of a fault condition on the system, means for deriving a voltage from the system dependent on the instantaneous value of the system voltage, means for deriving a voltage from the system dependent on the instantaneous value of the system current, means for vectorially adding these two voltages together, and means for supplying the vector sum of these voltages to said device to cause operation thereof when the instantaneous value of the vector sum of these voltages is a maximum and when the value of the electrical quantity supplied to said device is indicative of a fault condition on the system.

9. A relay for affording protection for an electric power system and having an offset impedance characteristic comprising two electronic devices each having a control grid and a suppressor grid, means for supplying to the control grids of said devices alternate half cycles of a predetermined electrical quantity indicative of a fault condition on the system, means for deriving an electrical quantity from the system dependent upon the instantaneous value of the system voltage, means for deriving an electrical quantity from the system dependent upon the instantaneous value of the system current, and means for vectorially adding the derived quantities and for supplying alternate half cycles of the vector sum thereof to the suppressor grids of said device to cause operation thereof when the vector sum of the derived quantities is a maximum value and when the value of the electrical quantity supplied to the control grid is indicative of a fault condition on the system.

10. A relay arrangement for completing the trip circuit of a circuit interrupter in an electric power system comprising an electronic device having a control grid and a suppressor grid, a transformer for deriving from the power system a voltage dependent on the system voltage, a transactor for deriving from the power system a voltage dependent on the system current, means for shifting the phase relationship of the voltage derived by said transactor so that the two derived voltages are substantially 180° out-of-phase during fault conditions, circuit means for comparing the derived voltages and for supplying the resultant voltage to the control grid of said electronic device, and a pulsing circuit energized by said transformer for energizing the suppressor grid of said electronic device when the instantaneous voltage of the power system is a maximum value to cause said device to operate when the voltage supplied to the control grid thereof is indicative of a fault on the power system.

11. A relay arrangement for completing the trip circuit of a circuit interrupter in an electric power system comprising an electronic device having a control grid and a suppressor grid, a transformer for deriving from the power system a voltage dependent on the system voltage, a transactor for deriving from the power system a voltage dependent on the system current, means for shifting the phase relationship of the voltage derived by said transactor so that the two derived voltages are substantially 180° out-of-phase during fault conditions, circuit means for comparing the derived voltages and for supplying the resultant voltage to the control grid of said electronic device, and a pulsing circuit energized by said transformer for energizing the suppressor grid of said electronic device when the instantaneous voltage of the power system is a maximum value to cause said device to operate when the voltage supplied to the control grid thereof is indicative of a fault on the power system, and means for completing the trip circuit of the circuit interrupter in the power system circuit including a gas-filled tube connected in the trip circuit of the interrupter and a capacitor disposed between the plate terminal of said device and the cathode terminal of said gas-filled tube for causing said gas-filled tube to operate in response to operation of said device.

12. A relay arrangement having an offset impedance characteristic for completing the trip circuit of a circuit interrupter in an electric power system comprising an electronic device having a control grid and a suppressor grid, a transformer for deriving from the power system a voltage dependent on the system voltage, a transactor for deriving from the power system a voltage dependent on the system current, means for shifting the phase relationship of the voltage derived by said transactor so that the two derived voltages are substantially 180° out-of-phase during fault conditions, circuit means for comparing the derived voltages and for supplying the resultant voltage to the control grid of said electronic device, and a pulsing circuit energized by a voltage derived by said transformer and another voltage vectorially added thereto and derived by said transactor for energizing the suppressor grid of said electronic device when the instantaneous voltage supplied to said pulsing circuit is a maximum value to cause said device to operate when the voltage supplied to the control grid thereof is indicative of a fault on the power system.

13. A mho relay for affording protection for an electric power system comprising electronic means, means for deriving from the system a voltage dependent on the system voltage, means for deriving from the system a voltage dependent on the system current, means for shifting at least one of these voltages so that the two derived voltages are substantially 180° out-of-phase during fault conditions, means for comparing these two voltages and for supplying the resultant voltage to said electronic means, and means for supplying an energizing pulse to said electronic means at the instant when the system voltage is a maximum to cause said electronic means to operate if said resultant voltage is indicative of a fault condition on the system.

ALBERT R. van C. WARRINGTON.

REFERENCES CITED

The following references are of record in the file of this patent:

UNITED STATES PATENTS

| Number | Name | Date |
|---|---|---|
| 1,967,850 | Wideroe | July 24, 1934 |
| 2,027,214 | Wideroe | Jan. 7, 1936 |
| 2,299,561 | Bivens | Oct. 20, 1942 |
| 2,399,322 | Carlin | Apr. 30, 1946 |
| 2,405,081 | Warrington | July 30, 1946 |

Certificate of Correction

Patent No. 2,511,680                            June 13, 1950

ALBERT R. van C. WARRINGTON

It is hereby certified that error appears in the printed specification of the above numbered patent requiring correction as follows:

Column 1, line 12, for "elctromagnetic" read *electromagnetic*; column 8, line 4, for "Equation 5" read *Equation 1*; column 9, line 19, for the right-hand portion of the equation reading $$\text{``}\frac{K+K_0)^2\text{''}}{2} \quad \text{read} \quad \frac{(K+K_0)^2}{2}$$

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*